United States Patent [19]

Hatori et al.

[11] Patent Number: 4,837,618
[45] Date of Patent: Jun. 6, 1989

[54] MOVING IMAGE SIGNAL CODING SYSTEM

[75] Inventors: Yoshinori Hatori, Kawasaki; Yoichi Kato, Yokohama; Mutsumi Ohta; Yasuhiro Kosugi, both of Tokyo, all of Japan

[73] Assignees: Kokusai Denshin Denwa Co., Ltd., Shinjuku; Nippon Telegraph and Telephone Corporation, Chiyoda; NEC Corporation, Minato; Fujitsu Limited, Kawasaki, all of Japan

[21] Appl. No.: 118,467

[22] Filed: Nov. 9, 1987

[30] Foreign Application Priority Data

Nov. 10, 1986 [JP] Japan .................... 61-267367

[51] Int. Cl.⁴ .................................. H04N 7/12
[52] U.S. Cl. ........................ 358/135; 358/136
[58] Field of Search ............. 358/136, 135, 133, 105, 358/141

[56] References Cited

U.S. PATENT DOCUMENTS

| | | | |
|---|---|---|---|
| 3,185,824 | 5/1965 | Blasbalg et al. ............ | 358/136 X |
| 4,077,053 | 2/1978 | Ishiguro . | |
| 4,546,386 | 10/1985 | Matsumoto et al. .......... | 358/136 |
| 4,723,161 | 2/1988 | Koga ....................... | 358/135 X |

FOREIGN PATENT DOCUMENTS

| | | |
|---|---|---|
| 55-115780 | 9/1980 | Japan . |
| 55-158784 | 12/1980 | Japan . |
| 57-041069 | 3/1982 | Japan . |
| 57-199379 | 12/1982 | Japan . |

Primary Examiner—James J. Groody
Assistant Examiner—Victor R. Kostak
Attorney, Agent, or Firm—Staas & Halsey

[57] ABSTRACT

A system of coding moving image signals produces a predictive error signal by a predictive coding based on inter-frame correlation and quantizing the predictive error signal for each block of a picture frame constituted by N lines of M pixels. The system includes a block coding/non-coding decision unit for calculating a first evaluation value Sm of the predictive error signal for each block of the picture frame. This unit decides that block non-coding is applicable when the first evaluation value Sm is less than a first threshold value $T_1$ and that block coding is applicable when the first evaluation value Sm is greater than the first threshold value $T_1$. The predictive error signal is not transmitted when the result of the decision is for block non-coding, and the predictive error signal is quantized and transmitted when the result of the decision is for block coding.

8 Claims, 9 Drawing Sheets

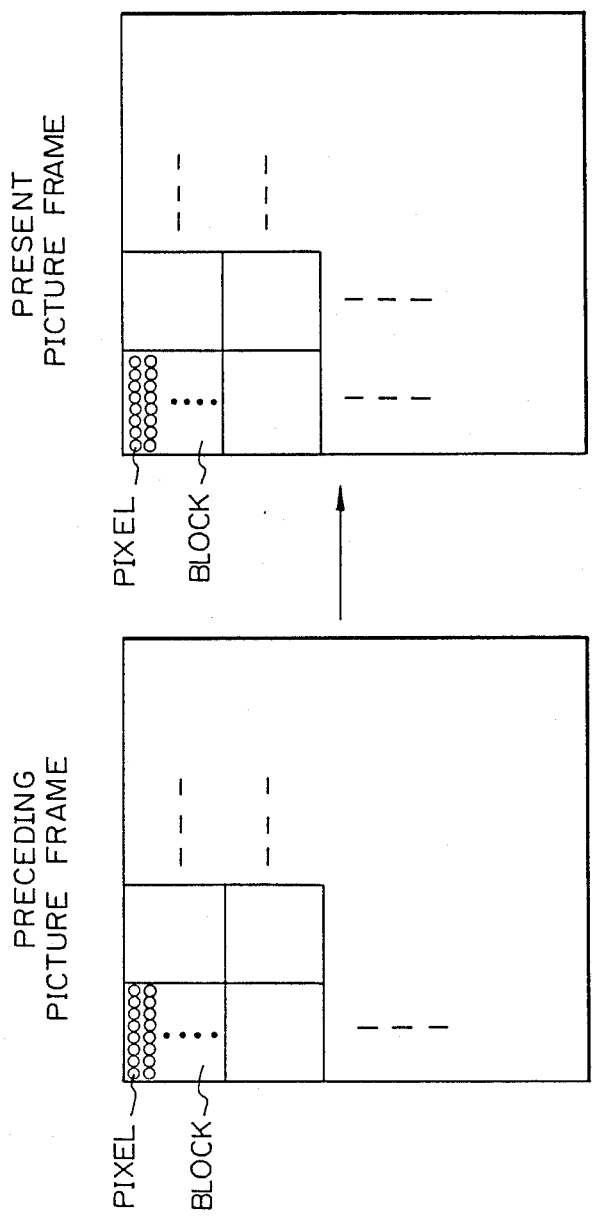

Fig. 2  TRANSMITTED DATA (PER EACH BLOCK)
(1) FOR CODING
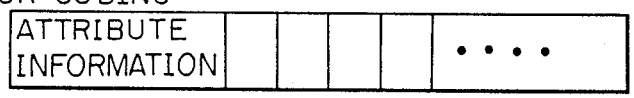
(2) FOR NON-CODING
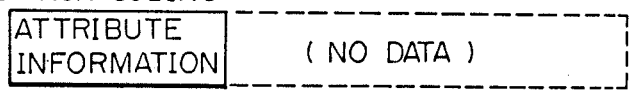
Fig. 7
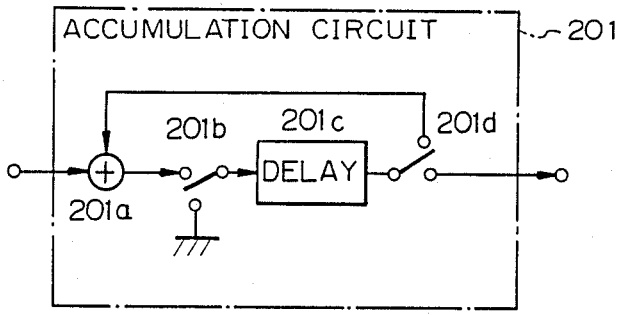
Fig. 8
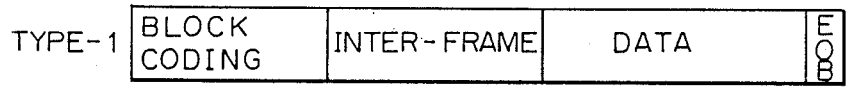
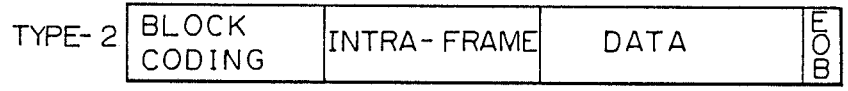
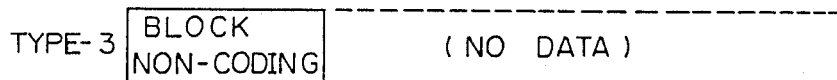

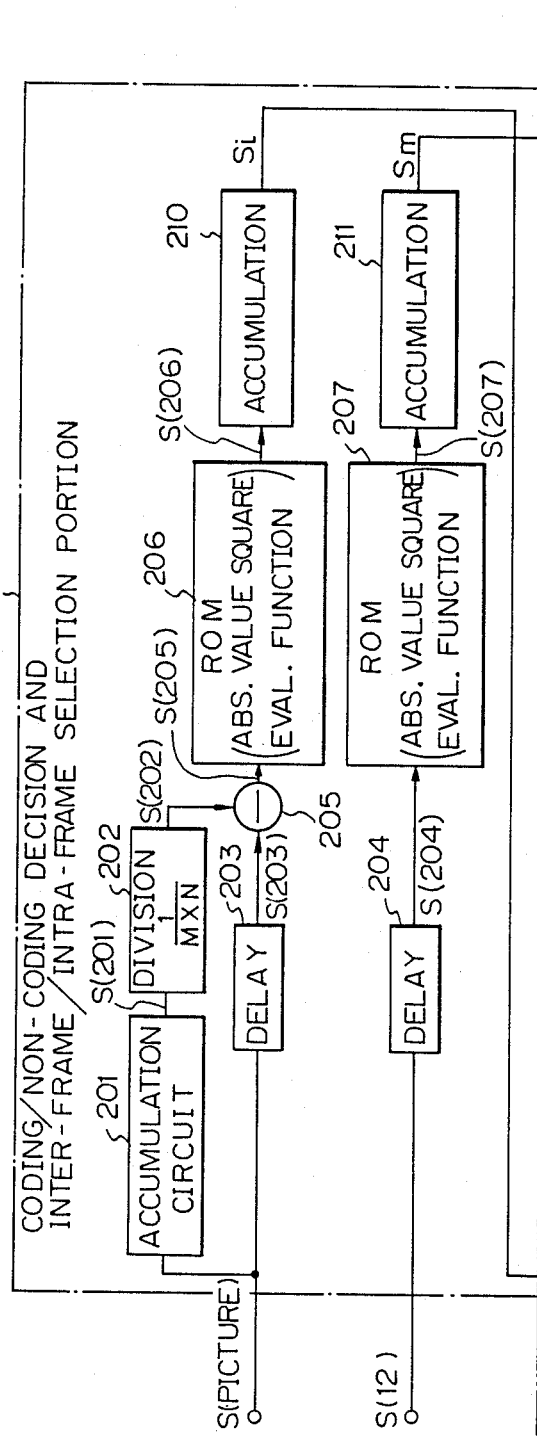

| ABSOLUTE VALUE OF PREDICTIVE ERROR | EVALUATION FUNCTION OUTPUT |
|---|---|
| 0 ~ 7 | 0 |
| 8 ~ 15 | 1 |
| 16 ~ 23 | 2 |
| 24 ~ 31 | 3 |
| 32 ~ 39 | 4 |
| 40 ~ 47 | 5 |
| 48 ~ 55 | 6 |
| 56 ~ 63 | 7 |
| 64 ~ | 8 |

MOVING IMAGE SIGNAL CODING SYSTEM

CROSS REFERENCE TO RELATED APPLICATION

The subject matter of this invention is related to the subject matter of U.S. patent application Ser. No. 021,909 filed Mar. 4, 1987.

BACKGROUND OF THE INVENTION

1. Field of the Invention

The present invention is related to a system of coding a moving image, more particularly to the coding of a moving image signal used in a television conference system.

2. Description of the Related Art

In the prior art, to increase the efficiency of the coding of a moving image(motion and time-varying imagery) of a picture, a predictive error prediction coding system, for example, an inter-frame prediction system or a movement compensation prediction system, utilizing a correlation between picture frames, is known. Also, it is known that an orthogonal transformation coding can be applied to a predictive error coding system by utilizing the phenomenon that higher order frequencies have a low energy when a picture. signal is expressed in the form of frequencies.

However, many difficulties are encountered in coding the predictive error signal. Picture signals, and especially moving image signals, are not steady. Among the picture frames for the moving image signals, there are frames representing abrupt motion and frames representing moderate motion. In addition, even a single frame includes a portion representing abrupt motion and a portion representing moderate motion. A simple pattern may be included in a given frame, and the correlation between adjacent pixels in that pattern often cannot be easily established, and thus the local characteristics of the moving image signals are greatly changed. If a single coding method is used for various situations, a high coding efficiency cannot be attained. In other words, if different coding methods employed in correspondence with the picture signal characteristics which are locally changed are not used, a highly efficient coding cannot be attained.

In a picture portion representing a considerable motion, when an intra-frame difference signal is calculated, many coded signals must be transmitted compared with the case where an input picture signal is coded without processing. Even if a total change in one block subjected to orthogonal transformation is small, a specific frequency component, for example, only a DC component, is often changed. When this value is transmitted, a mean value of the block is varied, resulting in tile-like noises, and thus the quality of the displayed picture is degraded.

SUMMARY OF THE INVENTION

It is an object of the present invention to provide an improved system of coding moving image signals utilizing the correlation between the picture frames of the moving image in which the coding efficiency is enhanced.

In accordance with an aspect of the present invention, there is provided a system of coding moving image signals to produce a predictive error signal by a predictive coding based on an inter-frame correlation and quantizing by a quantization unit the produced predictive error signal for each block of a picture frame constituted by N lines of M pixels. The system includes a block coding/non-coding decision unit for calculating a first evaluation value Sm of the predictive error signal for each block of the picture frame and deciding that a block "non-coding" (to be neither coded nor transmitted) is applicable when the first evaluation value Sm is less than a first threshold value $T_1$, and deciding that a block "coding" (to be coded and transmitted) is applicable when the first evaluation value Sm is greater than the first threshold value $T_1$. The predictive error signal is not transmitted when the result of the decision is for a block non-coding, and the predictive error signal is quantized and transmitted when the result of the decision is for a block coding.

BRIEF DESCRIPTION OF THE DRAWINGS

In the drawings: FIG. 1 shows a pattern of a picture frame used in the system according to the present invention;

FIG. 2 shows patterns of transmitted data used in the system according to the present invention;

FIG. 7 shows the structure of an accumulation circuit used in the coding/non-coding decision portion of FIG. 6;

FIG. 8 shows pattern types of a signal used in the system of FIGS. 3, 4, and 5;

DESCRIPTION OF THE PREFERRED EMBODIMENTS

Before describing the preferred embodiment of the present invention, a pattern of a picture frame used in the system according to the present invention is described with reference to FIG. 1, and patterns of transmitted data used in the system according to the present invention are described with reference to FIG. 2.

With regard to the transmission of television pictures in a television conference system, the present picture frame which is being transmitted, and the preceding picture frame which has just been transmitted, are shown in FIG. 1. Each of the picture frames is constituted by a plurality of blocks, and each of the blocks is constituted by a plurality of pixels, for example, 8 lines of 8 pixels.

Usually the transmission of the picture frame from the transmitter to the receiver is carried out for each block as a unit.

The pattern of transmitted data for each block as a unit is shown in FIG. 2. The upper pattern (1) is the pattern for coding (to be coded and transmitted) which is constituted by the attribute information and the information inside one block. The lower pattern (2) is the pattern for non-coding (to be neither coded nor transmitted) which is constituted simply by the attribute information.

In the transmission of picture frames in the television conference system, it is known that the portion of the area of a picture frame where some motion is represented is usually less than 10% of the entire frame. Accordingly, it is desirable to compress the data of the picture, to reduce the amount of data transmitted per unit time, expressed as unit "bps", and accordingly, to reduce the cost of communications in the television conference system. With regard to the data transmission amount per unit time, 1.5 Mbps is usually used, but a reduction of the data transmission amount per unit time to about 384 Kbps or less has been attempted.

Figure 3:
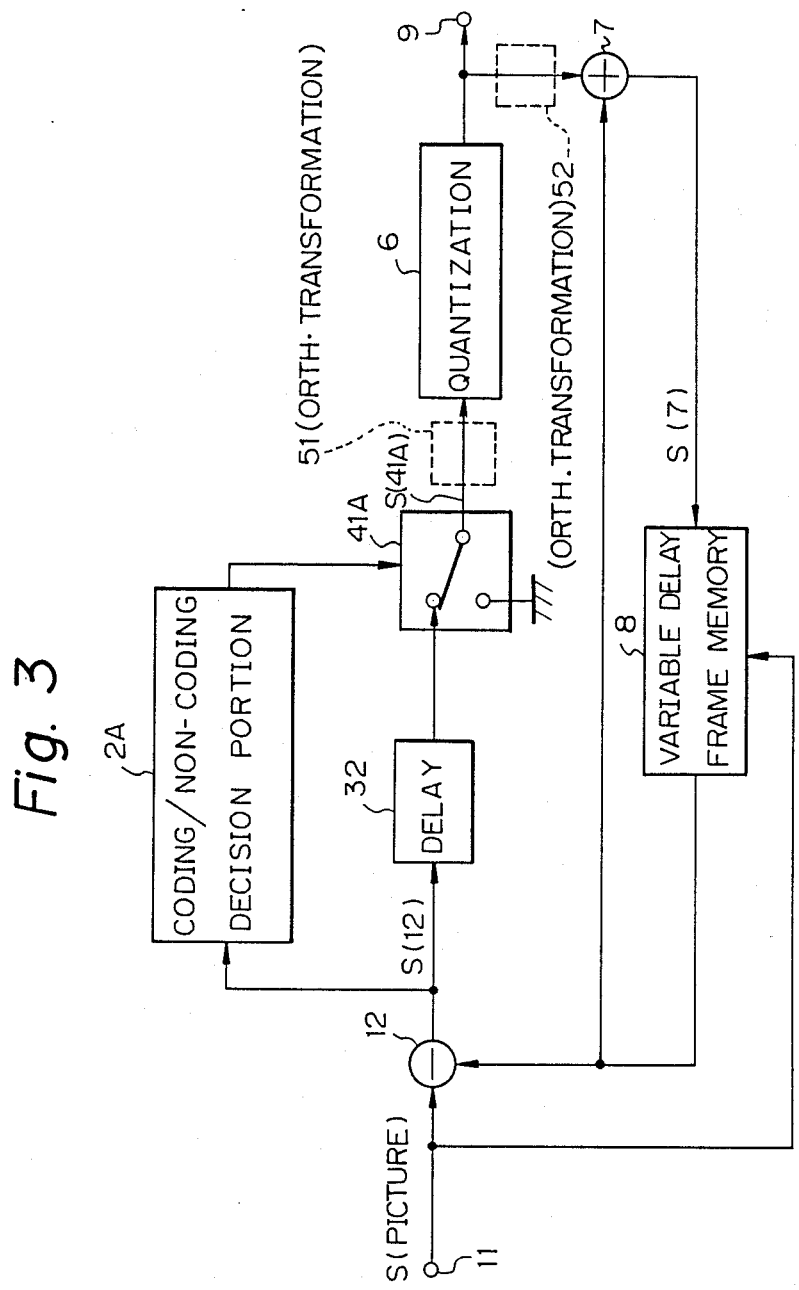
FIG. 3 is a block diagram of a system of coding moving image signals according to an embodiment of the present invention.

A system of coding moving image signals according to an embodiment of the present invention is shown in FIG. 3. The system of FIG. 3 includes an input terminal 11, a subtracter 12, a coding/non-coding decision portion 2A, a delay circuit 32, a switching circuit 41A, a quantization circuit 6, an adder 7, a variable delay frame memory 8, and an output terminal 9.

The input picture signal is a block of a plurality of pixels of a moving image(picture) signal. The picture signal S(PICTURE) at the input terminal 11 is subtracted in the subtracter 12 by a prediction value representing an inter-frame prediction value or a movement compensation prediction value, and an inter-frame predictive error signal S(12) is obtained. This predictive error signal and the picture signal are supplied to the coding/non-coding decision portion 2A.

The delay circuit 32 corrects delay components generated by the decision portion 2A. A switching portion 41A is switched in response to the output coding/noncoding signal from the decision portion 2A to select the delayed inter-frame predictive error signal S(12) or the intra-frame signal. The selected signal is output as a signal S(41A) to a quantization circuit 6. The output of the quantization circuit 6 can be added to the inter-frame prediction value by an adder 7 to obtain a decoded signal S(7) of the picture signal.

The decoded signal S(7) is stored in a variable delay frame memory 8 and is used for the subsequent prediction coding. The variable delay frame memory 8 stores one-frame picture data. If necessary, the frame memory 8 compares the picture signal S(PICTURE) with the one-frame picture data to detect the extent of the motion and delivers a motion compensation prediction value signal.

The picture signal is processed in units of blocks each comprising N lines of M pixels. Assume that M=N =8, and accordingly, the block size is 8×8. When a moving image signal such as a television conference signal is to be processed, a large error does not occur when the prediction coding utilizes the inter-frame correlation of the background portions or the like of adjacent frames. In still portions between the adjacent frames, a difference signal is not sent, and thus less signals are required to be sent, thereby improving the transmission efficiency. However, even in such a background portion, noise may be superimposed on the picture, or a density of the picture may be varied due to shadows of nearby people.

If an orthogonal transformation means is provided, the subsequent orthogonal transformation causes an additional change in only a given transformation coefficient, and a large transformation coefficient value is often generated. Even if a difference quantization is performed after the orthogonal transformation, and a coefficient value larger than a given threshold value is sent, a signal must be sent for a block which does not require signal transmission. In this case, the efficiency of transmission efficiency is lowered. In addition, a block subjected to a transmission of a change in density, i.e., an orthogonally transformed DC component, is mixed with a block not requiring such a transmission. Further, the block positions as a function of time are changed to cause a tile-like noise, and thus visual interference.

When a signal obtained by a prediction scheme substantially free from an error in a still portion as in inter-frame prediction or motion compensation prediction is to be orthogonally transformed in the subsequent stage, the coding/non-coding validity of a plurality of pixels is discriminated prior to the orthogonal transformation. Therefore, the deterioration of efficiency and image quality caused as mentioned above can be prevented.

In coding utilizing inter-frame correlation, predictive error value is large in a block representing considerable motion. When the orthogonal transformation is performed for such a block, coefficient signals having large values are undesirably delivered. However, when the input picture signal is orthogonally transformed without modifications, output signals are concentrated on relatively low frequency components, due to the characteristics of the picture signal. In a hybrid coding system as combination of a prediction coding utilizing inter-frame coding and orthogonal transformation coding, it is effective to selectively use the inter-frame predictive error signal and the intra-frame signal. A zero DC component appears in the inter-frame predictive error signal, and a large value appears in the DC component of the input picture signal. Therefore, the characteristics of the coefficient components corresponding to the orthogonally transformed DC component are changed. In such an apparatus, an inter-frame/intra-frame selection method is utilized to overcome the problem in hybrid coding as a combination of an inter-frame prediction and an orthogonal transformation.

Figure 6B:
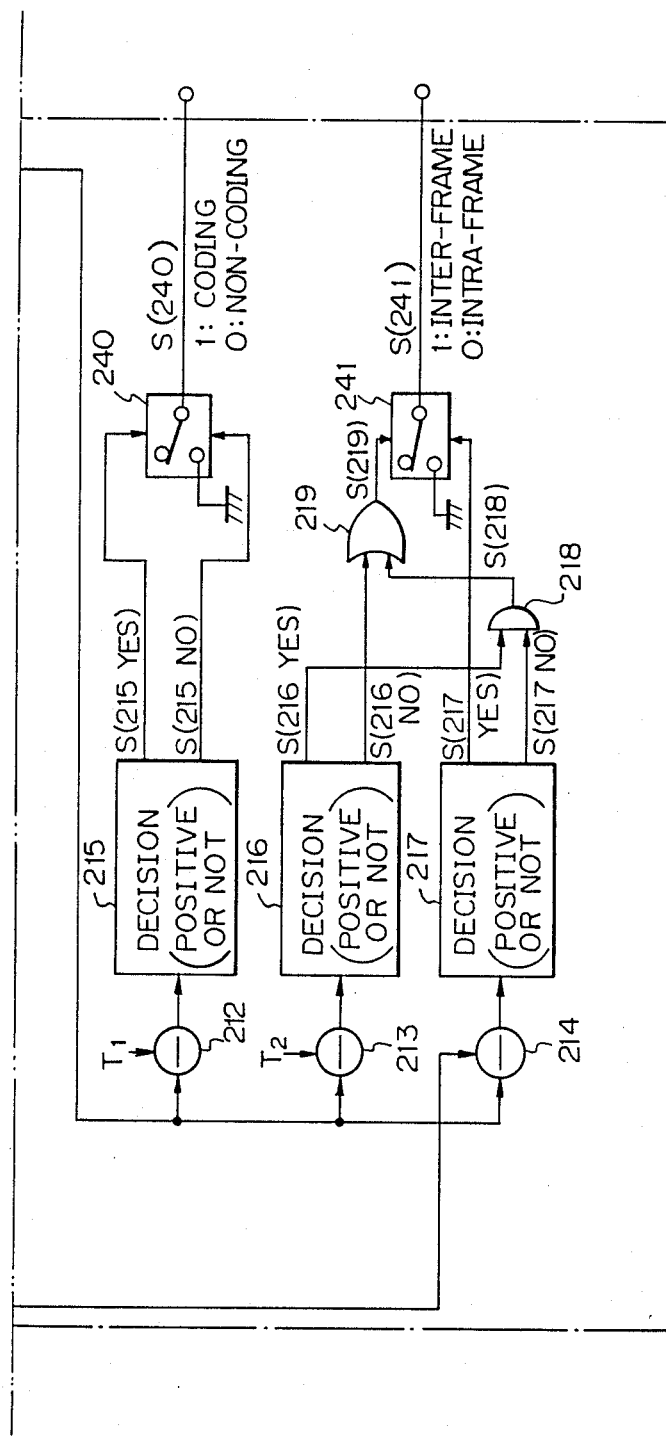
FIG. 6 shows the structure of a coding/non-coding decision portion applicable to the systems of FIGS. 3, 4, and 5.

Several discrimination methods may be utilized in the coding/non-coding decision and inter-frame/intra-frame selection portion 2 illustrated in, e.g., FIGS. 6A and 6B. For example, the same block as that for orthogonal transformation, for example, a block having 8 lines of 8 pixels, may be used as a unit, and a sum Sm of a square of the predictive error signal of the pixel in the block may be calculated. If the evaluation value Sm is smaller than a proper threshold value $T_1$, the currently input block is discriminated as a non-coding block, and all predictive error signals of the corresponding block are set to zero. Another method may be utilized to calculate the evaluation value Sm. For example, a one-block sum of absolute values of the predictive error signals, or a one-block sum of the evaluation function output values obtained on the basis of the absolute values of the predictive error signals (FIG. 11) may be calculated to obtain the sum of the evaluation Sm.

Figure 4:
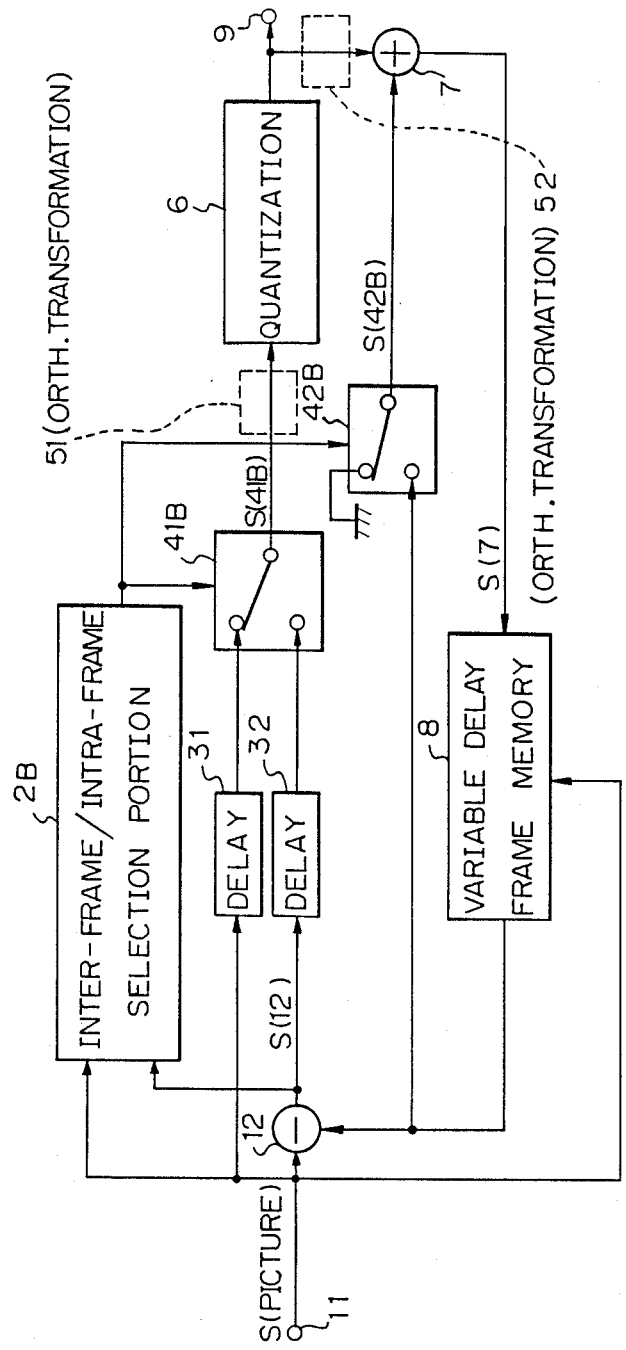
FIG. 4 is a block diagram of a system of coding moving image signals according to another embodiment of the present invention.

A system of coding moving image signals according to another embodiment of the present invention is shown in FIG. 4. The system of FIG. 4 includes an input terminal 11, a subtracter 12, an inter-frame/intra-frame selection portion 2B, delay circuits 31 and 32, switching circuits 41B and 42B, a quantization circuit 6, an adder 7, a variable delay frame memory 8, and an output terminal 9.

The input picture signal is a block of a plurality of pixels of a moving image signal. The picture signal S(PICTURE) at the input terminal 11 is subtracted in the subtracter 12 by a prediction value representing an inter-frame prediction value or a movement compensation prediction value, and an inter-frame predictive error signal S(12) is obtained. This predictive error signal and the picture signal are supplied to the inter-frame/intra-frame selection portion 2B.

The delay circuits 31 and 32 correct delay components generated by the portion B. A switching portion 41B is switched in response to the output signal of inter-frame/intra-frame from the portion B to select the inter-frame predictive error prediction signal S(12) or the intra-frame signal. The selected signal is output as a signal S(41B) to a quantization circuit 6. The output of the quantization circuit 6 can be added to the inter-frame prediction value by an adder 7 to obtain a decoded signal S(7) of the picture signal. The adder 7 adds the quantized signal S41B to the prediction signal or a zero signal, selected by a switching portion 42B controlled in response to the inter-frame/intra-frame selection signal from the portion 2. The decoded signal S(7) from adder 7 is stored in a variable delay frame memory 8 and is used for the subsequent prediction coding, in fundamentally the same manner as in the case of the system of FIG. 3.

If an orthogonal transformation means is provided, the subsequent orthogonal transformation causes an additional change in only a given transformation coefficient, and a large transformation coefficient value is often generated. Even if a difference quantization is performed after orthogonal transformation, and a coefficient value larger than a given threshold value is sent, a signal must be sent for a block which does not require signal transmission. In this case, the efficiency of transmission efficiency is lowered. In addition, a block subjected to a transmission of a change in density, i.e., an orthogonally transformed DC component, is mixed with a block not requiring such a transmission. In addition, the block positions as a function of time are changed to cause tile-like noise, and thus visual interference.

When a signal obtained by a prediction scheme substantially free from an error in a still portion as in inter-frame prediction or motion compensation prediction is to be orthogonally transformed in the subsequent stage, the coding/non-coding of a plurality of pixels is discriminated prior to orthogonal transformation. Therefore, the deterioration of efficiency and image quality caused as mentioned above can be prevented.

Figure 5:
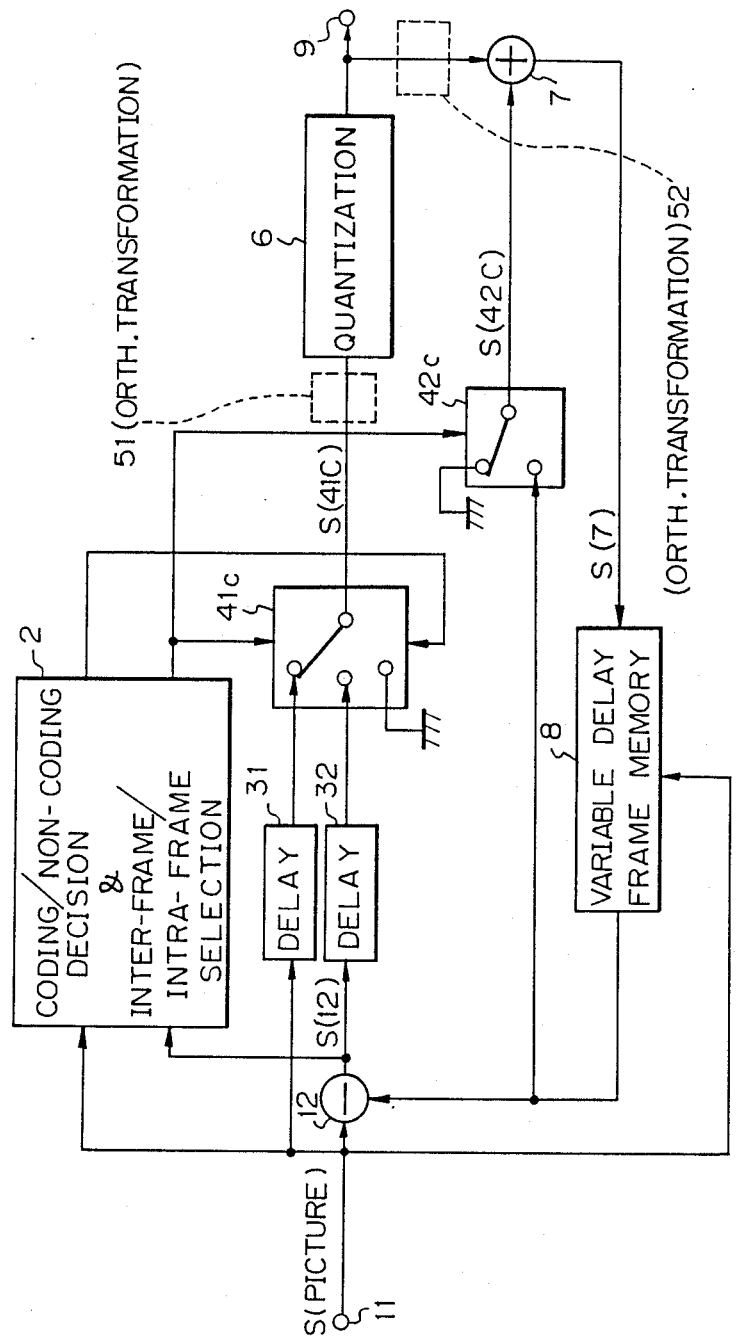
FIG. 5 is a block diagram of a system of coding moving image signals according to still another embodiment of the present invention.

A system of coding moving picture signals according to still another embodiment of the present invention is shown in FIG. 5. The system of FIG. 5 includes an input terminal 11, a subtracter 12, a coding/non-coding decision and inter-frame/intra-frame selection portion 2, delay circuits 31 and 32; switching circuits 41B and 42B, a quantization circuit 6, an adder 7, a variable delay frame memory 8, and an output terminal 9.

The input picture signal is a block of a plurality of pixels of a moving image(picture) signal. The picture signal S(PICTURE) at the input terminal 11 is subtracted in the subtracter 12 by a prediction value representing an inter-frame prediction value or a movement compensation prediction value, and an inter-frame predictive error signal S(12) is obtained. This predictive error signal and the picture signal are supplied to the coding/non-coding decision and inter-frame/intra-frame selection portion 2.

Delay circuits 31 and 32 correct delay components generated by the portion 2. A switching portion 41c is switched in response to the output coding/non-coding signal and the output inter-frame/intra-frame signal from the portion 2 to select the inter-frame predictive error prediction signal S(12) or the intra-frame signal. The selected signal is output as a signal S(41C) to a quantization circuit 6. The output of the quantization circuit 6 can be added to the inter-frame prediction value by an adder 7 to obtain a decoded signal S(7) of the picture signal. The prediction signal or the zero signal can be selected by a switching portion 42C controlled in response to the inter-frame/intra-frame selection signal from the portion 2.

The decoded signal S(7) is stored in a variable delay frame memory 8 and is used for the subsequent prediction coding, in fundamentally the same manner as in the case of the system of FIG. 3.

If an orthogonal transformation means is provided, the subsequent orthogonal transformation causes an additional change in only a given transformation coefficient, and a large transformation coefficient value is often generated. Even if a difference quantization is performed after the orthogonal transformation, and a coefficient value larger than a given threshold value is sent, a signal must be sent for a block which does not require signal transmission. In this case, the transmission efficiency is lowered. In addition, a block subjected to transmission of a change in density, i.e., an orthogonally transformed DC component is mixed with a block not requiring such a transmission. In addition, the block positions as a function of time are changed to cause tile-like noise, and thus visual interference.

When a signal obtained by a prediction scheme substantially free from an error in a still portion as in inter-frame prediction or motion compensation prediction is to be orthogonally transformed in the subsequent stage, the validity of a plurality of pixels is discriminated prior to the orthogonal transformation. Therefore, the deterioration of efficiency and image quality caused as mentioned above can be prevented.

In a modified embodiment of the present invention, the current block may be divided into sub-blocks having a size different from a block size, for the orthogonal transformation. For example, if an orthogonal transformation is performed in a matrix of 8 lines of 8 pixels, the matrix is divided into sub-blocks each having a size of 4 pixels/4 lines. In this case, the evaluation value Sm of the inter-frame predictive error signal is calculated in units of sub-blocks and is compared with the proper threshold value $T_1$. If the current block includes a coding sub-block, the current block is decided to be a coding block. Otherwise, the current block is decided to be a non-coding block. When an inter-frame difference signal is to be processed in unit of blocks, each block includes a portion representing a considerable motion and a portion representing a small motion. If these portions are discriminated by the single evaluation of the block, the portion representing a considerable motion is damaged by the influence of a background portion or the like. To avoid this disadvantage, the evaluation value is calculated in unit of sub-blocks, and an accurate coding/non-coding decision can be made for a block representing a considerable motion.

The evaluation value can be used for an inter-frame/intra-frame selection. The same evaluation value Sm as in a coding/non-coding decision can be used for the inter-frame predictive error signal. As for the input picture signal, an average value of the input picture signal per block is calculated, and a difference between the input signal and the average value is calculated. A one-block sum of evaluation function output values determined in FIG. 11 on the basis of a one-block sum of a square of the difference signal, a one-block sum of absolute values of the difference signal, or the one-block absolute values of the differences, may be obtained, and therefore, the evaluation value Si for the input picture signal can be obtained. By utilizing the evaluation values Sm and Si, the predictive error prediction signal obtained by the prediction value on the basis of the inter-frame correlation is selected and called an inter-frame mode when the evaluation value Sm of the inter-frame error prediction signals is smaller than a threshold value T2, or is larger than the threshold value T2 but smaller than the evaluation value Si of the input picture signal. Otherwise, i.e., if $Sm \geq T2$ and $Sm > Si$, then the input picture signal is selected. The selected signal is orthogonally transformed. This is called an intra-frame mode.

Figures 10, 11:
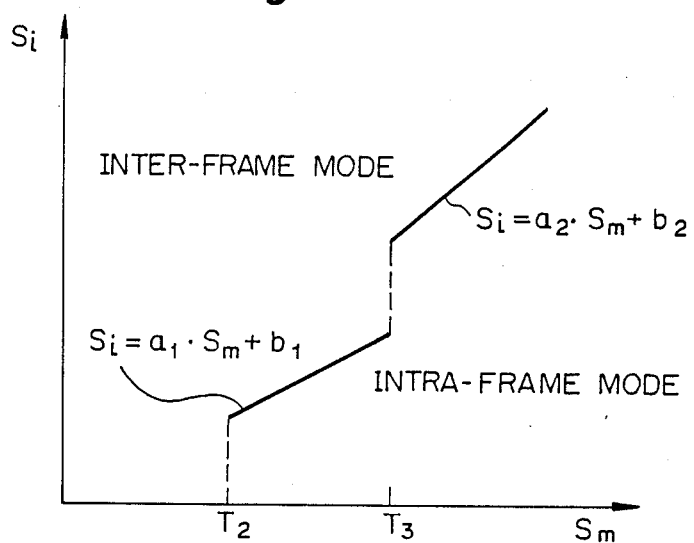
FIG. 10 shows another example of a relationship between evaluation values Sm and Si.
FIG. 11 shows an example of an evaluation function for predictive errors.

As shown in FIG. 10, for example, the discrimination threshold value is changed on the basis of the magnitude of Sm to select the inter-frame mode or the intra-frame mode. Furthermore, in the inter-frame/intra-frame selection, the currently input block may be divided into sub-blocks, and a selection may be performed in units of sub-blocks.

In the above description, a coding/non-coding decision is made independently of the inter-frame/intra-frame selection. However, these decision and selection operations may be simultaneously performed.

In sub-block discrimination, as described above, a portion representing a considerable motion in a given block can be distinguished from a portion representing a small motion in the given block. More specifically, only the portion generating a difference signal in the given block can be extracted, and the extracted portion can be orthogonally transformed. In this case, unnecessary information need not be sent, and therefore, the coding efficiency can be further improved. For this purpose, a control signal is output from the coding/non-coding decision and inter-frame/intra-frame selection portion 2, and the block size used in the subsequent orthogonal transformation portion 51 may be variable.

An arrangement of the coding/non-coding decision and inter-frame/intra-frame selection portion (2A, 2B, 2) in the systems shown in FIGS. 3, 4, and 5 will be described with reference to FIG. 6.

Input picture signals S(PICTURE) and S(12) in FIG. 6 are the same as those in FIGS. 3, 4, and 5. The signal S(PICTURE) is an input picture signal for the coding apparatus, and the signal S(12) is a predictive error signal representing a difference between prediction values obtained by utilizing a correlation between adjacent frames.

The input picture signal S(PICTURE) is supplied to an accumulation circuit 201, and a one-block picture signal value S(201) is output from the accumulation circuit 201. The accumulation circuit 201 comprises an adder 201a, a delay circuit 201c for delaying an input by a one-pixel period, and switching portions 201b and 201d, as shown in FIG. 7. The switching portion 201b serves as a switching portion for clearing the accumulated value of a loop to zero at the beginning of one block. The switching portion 201d serves as a switching portion for supplying a signal to an output S(201) when a count of one block is completed.

An output S(201) from the accumulation circuit 201 is divided by pixels $M \times N$ of one block by a division circuit 202. If $M=N=8$, then the division circuit 202 comprises a 6 bit shift register for delivering an average value S(202) of the input signal of the current block. The delay circuit 203 corrects an amount of delay corresponding to the time required by the division circuit 202.

A subtracter 205 calculates a difference between the one-block average value S(202) and the input signal value S(203) of the corresponding input signal, and a difference S(205) is output on the basis of the average value. A ROM 206 is arranged to eliminate a sign bit of the input signal. A ROM circuit 207 is also arranged. When a sum of a square of a difference between the input picture signal and the average value or an evaluation is used, the corresponding values are written in these ROM circuits, and output values therefrom are used for control. When the sum of the absolute values of the difference signals is used, the output of the ROM is made the same as the input of the ROM. An evaluation signal S(206) corresponding to the pixel prepared as described above is supplied to an accumulation circuit 210. The accumulation circuit 210 has a similar arrangement to that of the accumulation circuit 201. The evaluation value Si for the input picture signal is obtained at the output of the accumulation circuit 210.

Similarly, the predictive error signal S(12) is supplied and is delayed by a delay circuit 204 to obtain an amount of delay for the intra-frame mode, and an inter-frame difference value S(204) for the current block is obtained. The inter-frame difference value S(204) is supplied through a ROM 207, and an accumulator 211. The evaluation value Sm for the predicted error prediction signal is obtained at the output of the accumulation circuit 211.

The evaluation value Sm is supplied to subtracters 212, 213, and 214 and is subtracted by the threshold values $T_1$ and $T_2$, and the evaluation value Si. Outputs from the subtracters 212, 213, and 214 are supplied to decision circuits 215, 216, and 217, respectively, and the decision circuits 215, 216, and 217 output YES or NO decision signals. The decision signals S(215YES) and S(215NO) for a coding/non-coding decision are output as control signals for a switching portion 240. The coding/non-coding decision signal S(240) is output from the coding/non-coding decision and the inter-frame/intra-frame selection portion 2.

Inter-frame/intra-frame selection signals S(216YES), S(216NO), S(217YES), and S(217NO) are supplied to an AND gate 218 and an OR gate 219, thereby generating control signals S(219) and S(217YES). These signals are sent as control signals for a switching portion 241, to thereby generate the inter-frame/intra-frame selection signal S(241).

The coding/non-coding decision and inter-frame/intra-frame selection can be performed in units of sub-blocks by using an arrangement similar to the arrangement of FIG. 6. However, in this case, the block size must be changed to the sub-block size, and an OR gate for the deciding coding/non-coding is required in units of blocks.

In the systems of coding moving image shown in FIGS. 3, 4, and 5, it is possible to include an orthogonal transformation circuit 51 and a reverse orthogonal transformation circuit 52.

In the system shown in FIG. 3, 4, or 5, the block size for orthogonal transformation in the subsequent orthogonal transformation portion 51 (FIGS. 3, 4, and 5) can be properly selected from among $\frac{1}{2}M \times \frac{1}{2}N$, $\frac{1}{2}M \times N$ and $M \times \frac{1}{2}N$ (where the block size is $M \times N$) by the arrangement wherein the sub-block coding/non-coding information is output as the other output signal of the coding/non-coding decision and inter-frame/intra-frame selection portion and supplied to the orthogonal transformation portion 51.

Selection of the evaluation values Si and Sm by using threshold values $T_2$ and $T_3$ can be performed by a situation classification in correspondence with the inter-frame evaluation value Sm (FIG. 10). In this case, instead of subtracting the value Si in the subtracter 214, a value $a_2 S_1 - b_2$, where $a_2$ and $b_2$ are predetermined constants, is supplied by using a multiplier and an adder.

Examples of the pattern of the transmitted data by using the system of FIG. 3, 4, or 5 are shown in FIG. 8. The type-1 pattern is constituted by the block coding information, the inter-frame information, and the data, and the EOB information, in the case of the coding decision and the inter-frame selection. The type-2 pattern is constituted by the block coding information, the intra-frame information, and the data, and the EOB information, in the case of the coding decision and the intra-frame selection. The type-3 pattern is constituted simply by the block non-coding information, in the case of the non-coding decision.

Figure 9:
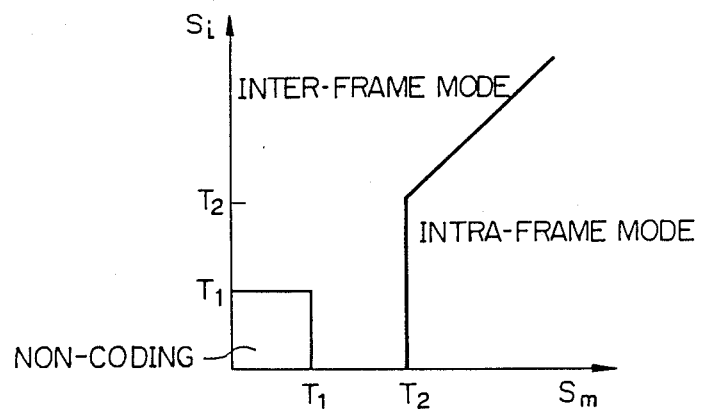
FIG. 9 shows an example of a relationship between evaluation values Sm and Si.

The operation of the decision circuits 216 and 217, the AND gate 218, the OR gate 219, and the switching circuit 241 is illustrated in FIG. 9.

The operation of the modification of the coding/non-coding decision and inter-frame/intra-frame selection portion in which the second threshold value $T_2$ and the third threshold value $T_3$ are used is illustrated in FIG. 10.

An example of the evaluation function used in a table stored in the ROM 206 or 207 is shown in FIG. 11.

What is claimed is:

1. A system for coding moving image signals using a predictive error signal produced by predictive coding base on inter-frame correlation, comprising:
   orthogonal transformation means for transforming orthogonally the predictive error signal to generate a transformed error signal;
   quantization means for quantizing the transformed error signal for each block of a picture frame constituted by N lines of M pixels; and
   block coding/non-coding decision means for calculating a first evaluation value of the predictive error signal for each block of the picture frame, for deciding that block non-coding is applicable when the first evaluation value is less than a first threshold value, for deciding that block coding is applicable when the first evaluation value Sm is greater than the first threshold value, for preventing quantization of the transformed error signal when block non-coding is applicable, and for permitting quantization of the transformed error signal when block coding is applicable, said block coding/non-coding decision means dividing each block into a plurality of sub-blocks having a size smaller than the block, calculating a sub-block evaluation value for each sub-block, comparing the sub-block evaluation value with a sub-block threshold value, and deciding that the block in question is to be coded when at least one coding sub-block exists and otherwise deciding that the block in question is not to be coded.

2. A system according to claim 1, further comprising orthogonal transformation means for transforming orthogonally a signal to be supplied to said quantization means before quantization by said quantization means, wherein an instruction of orthogonal transformation of one of $\frac{1}{2}M \times \frac{1}{2}N$, $\frac{1}{2}M \times N$, and $M \times \frac{1}{2}N$ is delivered from said coding/non-coding decision means when the at least one coding sub-block is in the block in question.

3. A system for coding moving image signals using a predictive error signal produced by predictive coding based on inter-frame correlation between a present input picture signal and a stored picture signal, comprising:
   quantization means for quantizing a signal for each block of a picture frame constituted by N lines of M pixels; and
   inter-frame/intra-frame selection means for calculating a first evaluation value Sm of the predictive error signal for each block of the picture frame and a second evaluation value Si, for comparing the calculated first (Sm) and second (Si) evaluation values, and for supplying to said quantization means the predictive error signal when $Sm < T_2$, where $T_2$ is a first threshold value and when $Sm < Si$, and otherwise supplying to said quantization means the present input picture signal.

4. A system according to claim 3, further comprising orthogonal transformation means for transforming orthogonally the signal to be supplied to said quantization means before quantization by said quantization means.

5. A system according to claim 3, wherein, using $T_3$ as a second threshold value, the predictive error signal is supplied when $Sm < T_2$, when $Si > a_1 Sm + b_1$, where $a_1$ and $b_1$ are predetermined constants, and $T_2 < Sm \leq T_3$, and when $Si > a_2 Sm + b_2$, where $a_2$ and $b_2$ are other predetermined constants, and $T_3 < Sm$; and in all other cases the present input picture signal is supplied.

6. A system according to claim 3, wherein said inter-frame/intra-frame selection means divides each block into a plurality of sub-blocks having a size smaller than the block, and makes a selection between the predictive error signal and the present input picture signal for each sub-block.

7. A system for coding moving image signals using a predictive error signal produced by a predictive coding based on inter-frame correlation between a present input picture signal and a stored picture signal, and quantization means for quantizing the predictive error signal for each block of a picture frame constituted by N lines of M pixels, said system comprising:
   block coding/non-coding decision means for calculating a first evaluation value Sm of the predictive error signal for each block of the picture frame, for deciding that block non-coding is applicable when the first evaluation value Sm is less than a predetermined first threshold value $T_1$, and for deciding that block coding is applicable when the first evaluation value Sm is greater than the first threshold value $T_1$;
   inter-frame/intra-frame selection means for calculating a second evaluation signal a Si representing evaluation of each block with regard to the input picture signal, for comparing the first (Sm) and second (Si) evaluation values, and for selecting the predictive error signal when $S_m < T_2$, where $T_2$ is a second threshold value, $S_m \leq S_i$, and selecting the present input picture signal in other cases; and means for preventing transmission of the predicted error signal when said block coding/non-coding decision means decides that block non-coding is applicable and said inter-frame/intra-frame selection means selects the present input picture signal and for transmitting the predicted error signal when said block coding/non-coding decision means decides that block coding is applicable and said inter-frame/intra-frame selection means selects the predictive error signal.

8. A system according to claim 7, further comprising orthogonal transformation means for transforming orthogonally the present input picture and predictive error signals when supplied to said quantization means before quantization by said quantization means.

* * * * *

UNITED STATES PATENT AND TRADEMARK OFFICE
CERTIFICATE OF CORRECTION

PATENT NO. : 4,837,618

DATED : June 6, 1989.

INVENTOR(S) : Hatori et al.

It is certified that error appears in the above-identified patent and that said Letters Patent is hereby corrected as shown below:

Col. 5, line 13, "B" should be --2B--;

line 15, "B" should be --2B--;

Col. 9, line 45, "base" should be --based--.

Col. 10, line 29, "<" should be -- $\leq$ --;

line 37, "<" should be -- $\leq$ --;

line 65, delete "a" (second occurrence).

Signed and Sealed this

Thirteenth Day of March, 1990

Attest:

JEFFREY M. SAMUELS

Attesting Officer

Acting Commissioner of Patents and Trademarks